United States Patent [19]
Purser

[11] Patent Number: 5,975,442
[45] Date of Patent: Nov. 2, 1999

[54] CABLE GRANULATOR

[76] Inventor: Brian Purser, Tickhill Farm, Caverswall Common, Stoke-on-Trent ST11 9EX, United Kingdom

[21] Appl. No.: 09/146,001

[22] Filed: Sep. 2, 1998

[51] Int. Cl.[6] .................................................. B02C 19/12
[52] U.S. Cl. .......................... 241/24.14; 209/3; 209/362; 209/479; 241/24.18; 241/73; 241/29; 241/79.1; 241/160
[58] Field of Search .............................. 209/3, 362, 439, 209/480, 471, 472, 920; 241/79.1, 160, 29, 73, 24.13, 24.14, 24.15, 24.17, 24.18

[56] References Cited

U.S. PATENT DOCUMENTS

| | | | |
|---|---|---|---|
| 2,464,216 | 3/1949 | Devol | 209/362 |
| 4,839,031 | 6/1989 | Ackermann et al. | 209/479 |
| 4,857,177 | 8/1989 | Lupton | 209/479 |
| 4,894,148 | 1/1990 | Frei | 209/479 |
| 4,964,577 | 10/1990 | Kopp | 241/24.18 |

FOREIGN PATENT DOCUMENTS

| | | | |
|---|---|---|---|
| 2232409 | 1/1974 | Germany | 241/24.18 |
| 53-27165 | 3/1978 | Japan | 241/24.18 |
| 2155937 | 10/1985 | United Kingdom | 241/24.18 |
| WO 92/18991 | 10/1992 | WIPO | 241/24.18 |

*Primary Examiner*—Mark Rosenbaum
*Attorney, Agent, or Firm*—Adams Law Firm, P.A.

[57] ABSTRACT

A granulator for separating the constituent parts of electrical cable containing relatively light-weight plastic covering relatively heavy electrically-conductive material. The granulator includes a first cutter for cutting the cable into short pieces and a second cutter for cutting the short pieces of cable into a still shorter length sufficient to detach the plastic from the electrically-conductive material to form a mixture of small pieces of plastic and electrically-conductive material. A vibratory sorter separates the mixture of plastic and electrically-conductive material, and includes an elongate, circular and spirally-extending track having a material inlet adjacent a bottom end thereof for receiving the mixture of plastic and electrically-conductive material for separation and a electrically-conductive material discharge slot adjacent a top end thereof for discharging electrically-conductive material. A vibrator impart vibratory motion to the mixture of plastic and electrically-conductive material sufficient to cause the mixture to move upwardly along the track and to vertically separate into a relatively heavy bottom layer of electrically conductive material and a top layer of relatively light-weight plastic pieces riding on top of the layer of electrically-conductive material. A plurality of vertically spaced-apart air jets apply respective radially-extending air blasts to the top layer of plastic pieces as the plastic pieces vibrate progressively up the track on top of the electrically-conductive material. The air blasts have sufficient energy to blow the plastic pieces off of the track but insufficient energy to blow the electrically-conductive material off of the track.

8 Claims, 15 Drawing Sheets

CABLE GRANULATOR

TECHNICAL FIELD AND BACKGROUND OF THE INVENTION

This invention relates to a cable granulator for the separating the constituent parts of many types of electrical cable into very small, compact, comminuted and separated material suitable for recycling. An enormous amount of electrical cable is disposed of as scrap each year. This amount of cable contains vast quantities of valuable copper wire, which is nevertheless often thrown away because of the cost of separating the copper from plastic sheathing within which it is encased, and from armoring and insulating materials formed around the copper wire and plastic sheathing.

Armored cable is particularly difficult to recycle, since by definition the armoring makes it much more difficult to get to the copper wire. Armored cable is generally formed of a bundle of plastic-sheathed copper wires wrapped by side-by-side spiral wrappings of heavy steel wire, which are then covered with a thick rubber or plastic dielectric outer coating.

Separation of the materials is not the only problem encountered in recycling this type of material. The materials must also be in very small pieces so that little air space is left in the mass of separated material. This permits a large amount of copper to be contained in a relatively small volume container, in order to be able to ship the material economically. Thus the term "granulator" has been selected as describing the function of the apparatus in reducing the pieces of material to very small size on the order of 3 mm. Uniformity of size is enhanced by requiring the cut pieces of cable to pass through a grill having 3 mm openings.

The granulator is compact, robust, simple to operate and easily adaptable to varying types of cable.

SUMMARY OF THE INVENTION

Therefore, it is an object of the invention to provide a granulator which permits economical recycling of electrical cable, including armored cable.

It is another object of the invention to provide a granulator which permits electrical cable to be chopped into very small pieces suitable for economical shipping.

It is another object of the invention to provide a granulator which is adapted to remove magnetic materials from non-magnetic materials contained in the cable.

It is another object of the invention to provide a granulator which will separate copper wire from its plastic sheathing.

It is another object of the invention to provide a granulator which uses low pressure, high volume air to separate copper wire from its plastic sheathing.

It is another object of the invention to provide a granulator which can operate continuously and at high production rates to produce recyclable copper in very small, uniformly-sized pieces.

These and other objects of the present invention are achieved in the preferred embodiments disclosed below by providing a granulator for separating the constituent parts of electrical cable containing relatively light-weight plastic covering relatively heavy electrically-conductive material. The granulator comprises a first cutter for cutting the cable into short pieces and a second cutter for cutting the short pieces of cable into a still shorter length sufficient to detach the plastic from the electrically-conductive material to form a mixture of small pieces of plastic and electrically-conductive material. A vibratory sorter is provided for separating the mixture of plastic and electrically-conductive material, and comprises an elongate, circular and spirally-extending track having a material inlet adjacent a bottom end thereof for receiving the mixture of plastic and electrically-conductive material for separation and a electrically-conductive material discharge slot adjacent a top end thereof for discharging electrically-conductive material. Vibration means impart vibratory motion to the mixture of plastic and electrically-conductive material sufficient to cause the mixture to move upwardly along the track and to vertically separate into a relatively heavy bottom layer of electrically conductive material and a top layer of relatively light-weight plastic pieces riding on top of the layer of electrically-conductive material. A plurality of vertically spaced-apart air jets apply respective radially-extending air blasts to the top layer of plastic pieces as the plastic pieces vibrate progressively up the track on top of the electrically-conductive material. The air blasts have sufficient energy to blow the plastic pieces off of the track but insufficient energy to blow the electrically-conductive material off of the track. A plurality of vertically spaced-apart discharge slots are aligned with the track for permitting passage from the track of the plastic pieces blown radially-outwardly by the air jets whereby only electrically-conductive material is ejected from the vibratory sorter through the electrically-conductive material discharge slot.

According to one preferred embodiment of the invention, the electrical cable includes magnetically-attractable armor which is cut into short pieces by the first cutter, and wherein the granulator includes magnet means for extracting the short pieces of magnetically-attractable armor from the plastic pieces and the electrically-conductive material.

According to another preferred embodiment of the invention, the spirally-extending track is contained within a bowl-shaped housing.

According to yet another preferred embodiment of the invention, the air blasts from the air jets are at a relatively high volume and low pressure.

An embodiment of the method according to the invention comprises the steps of cutting the cable into short pieces in a first cutting step, and then cutting the short pieces of cable to a still shorter length in a second cutting step sufficient to detach the plastic from the electrically-conductive material to form a mixture of small pieces of plastic and electrically-conductive material. The mixture of plastic and electrically-conductive material is separated, the separating step comprising the steps of introducing the mixture into an elongate, circular and spirally-extending track through a material inlet adjacent a bottom end thereof, imparting vibratory motion to the mixture of plastic and electrically-conductive material on the track sufficient to cause the mixture to move upwardly along the track and to vertically separate into a relatively heavy bottom layer of electrically conductive material and a top layer of relatively light-weight plastic pieces riding on top of the layer of electrically-conductive material, and applying a series of vertically spaced-apart, radially-extending air blasts to the top layer of plastic pieces as the plastic pieces vibrate progressively up the track on top of the electrically-conductive material, the air blasts having sufficient energy to blow the plastic pieces off of the track but insufficient energy to blow the electrically-conductive material off of the track. The radially-blown plastic pieces is radially discharged from the track, and the electrically-conductive material is ejected from the track through the electrically-conductive material discharge slot.

According to one preferred embodiment of the invention, the method includes the step of extracting any magnetically-attractable material in the electrical cable by means of magnet.

According to another preferred embodiment of the invention, the method includes the step of passing the cut pieces of plastic and electrically-conductive material through a grill having openings of a predetermined small size for insuring uniformity of the size of the plastic pieces and electrically-conductive material.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Material Processed in Granulator

Figure 1:
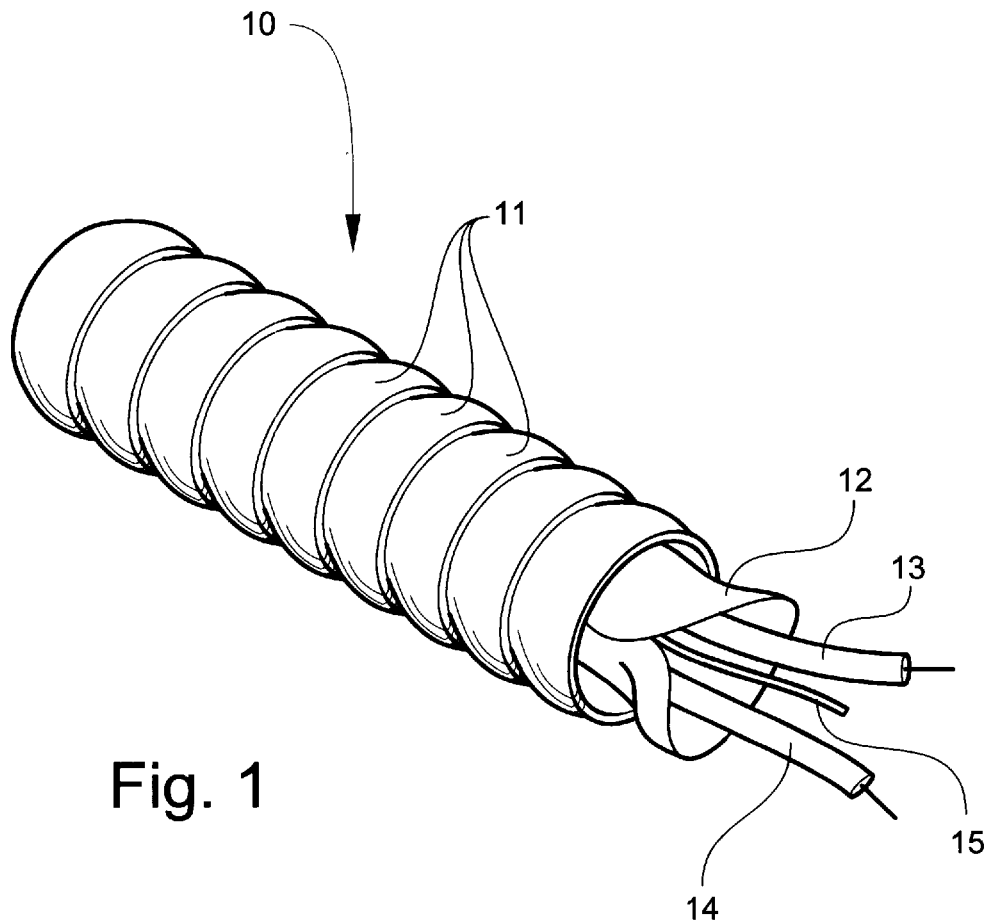
FIG. 1 is a perspective view of a type of armored cable which is suitable for recycling with the granulator according to the embodiment of the invention disclosed in this application.
Figure 2:
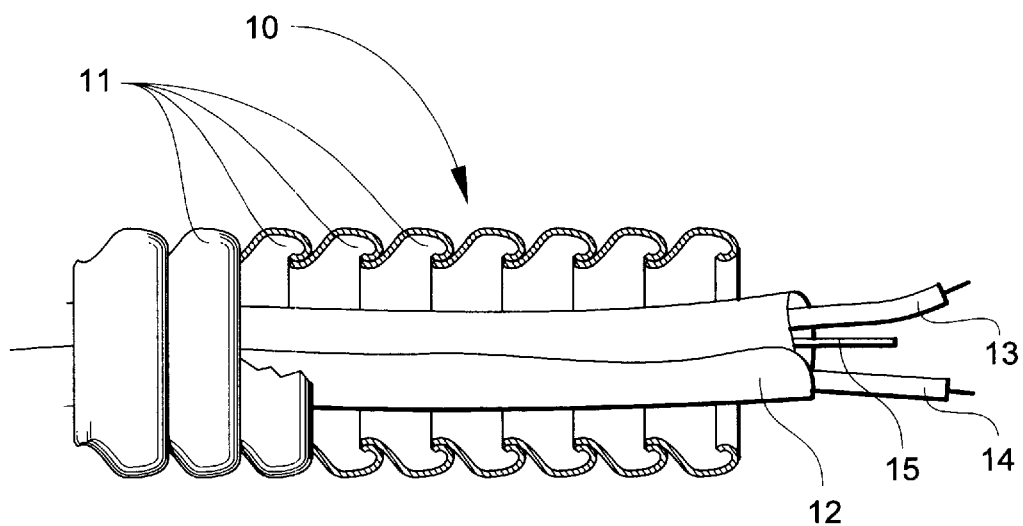
FIG. 2 is a cross-sectional view of the armored cable shown in FIG. 1.
Figure 3:
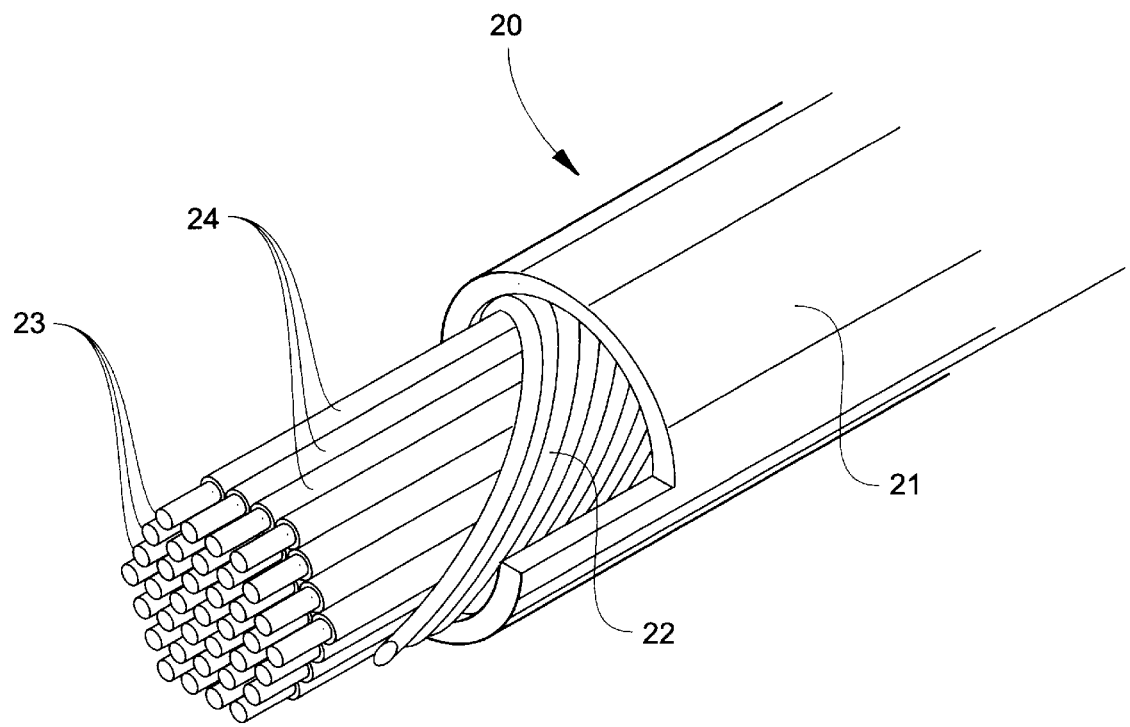
FIG. 3 is a perspective view of a different type of armored cable which is suitable for recycling with the granulator according to the embodiment of the invention disclosed in this application.

Referring now specifically to the drawings, a two forms of armored cable of the type which can be separated with the granulator according to the present invention are illustrated in FIGS. 1, 2 and 3. FIGS. 1 and 2 illustrate a common form of flexible, armored electrical cable 10 typically used in supplying electrical service within building structures. Cable 10 is formed from interlocked annular hollow metal segments 11 through which extends an elongate plastic sleeve 12. Sleeve 12 surrounds two plastic-encased copper transmission wires 13 and 14 and a bare ground wire 15. The metal segments 11 are designed to permit controlled flexing of the cable 10 sufficient to enable it to extend through circuitous conduit, wall passages and the like.

FIG. 3 illustrates a different armored cable 20 of the type used to transmit high volumes of communication signals. Cable 20 includes a heavy rubber outer cover 21 which protects the interior of the cable 20 from moisture and other contaminants. Armoring is provided by closely positioned spirally-extending wraps of heavy steel wire 22 which both protects and tightly integrates a plurality of parallel-extending communication wires 23 (usually copper) each of which is enclosed in its own plastic, dielectric sheathing 24. Cable thus comprises four distinct materials, the rubber outer covering 21, the protective steel wire 22, the copper wire 23 and the plastic sheathing 24. This armored cable 20 is particularly difficult to recycle, since the cable 20 is purposefully designed for heavy-duty uses in environments where damage from weather and accidental impacts must be avoided. Armored cable 20 contains a substantial amount of copper wire per unit of length which has substantial value if removed in such a manner that it is virtually completely devoid of contaminants and in very small pieces which minimize dead air space. In this application, the granulator 30 is described as it is configured to recycle cable 20. The operating principles of the invention make use of the fact that there is significant disparity between the specific gravity of copper (8.9) and plastic (approx 1.3–1.5).

SUMMARY OF OVERALL OPERATION OF GRANULATOR

Figure 4:
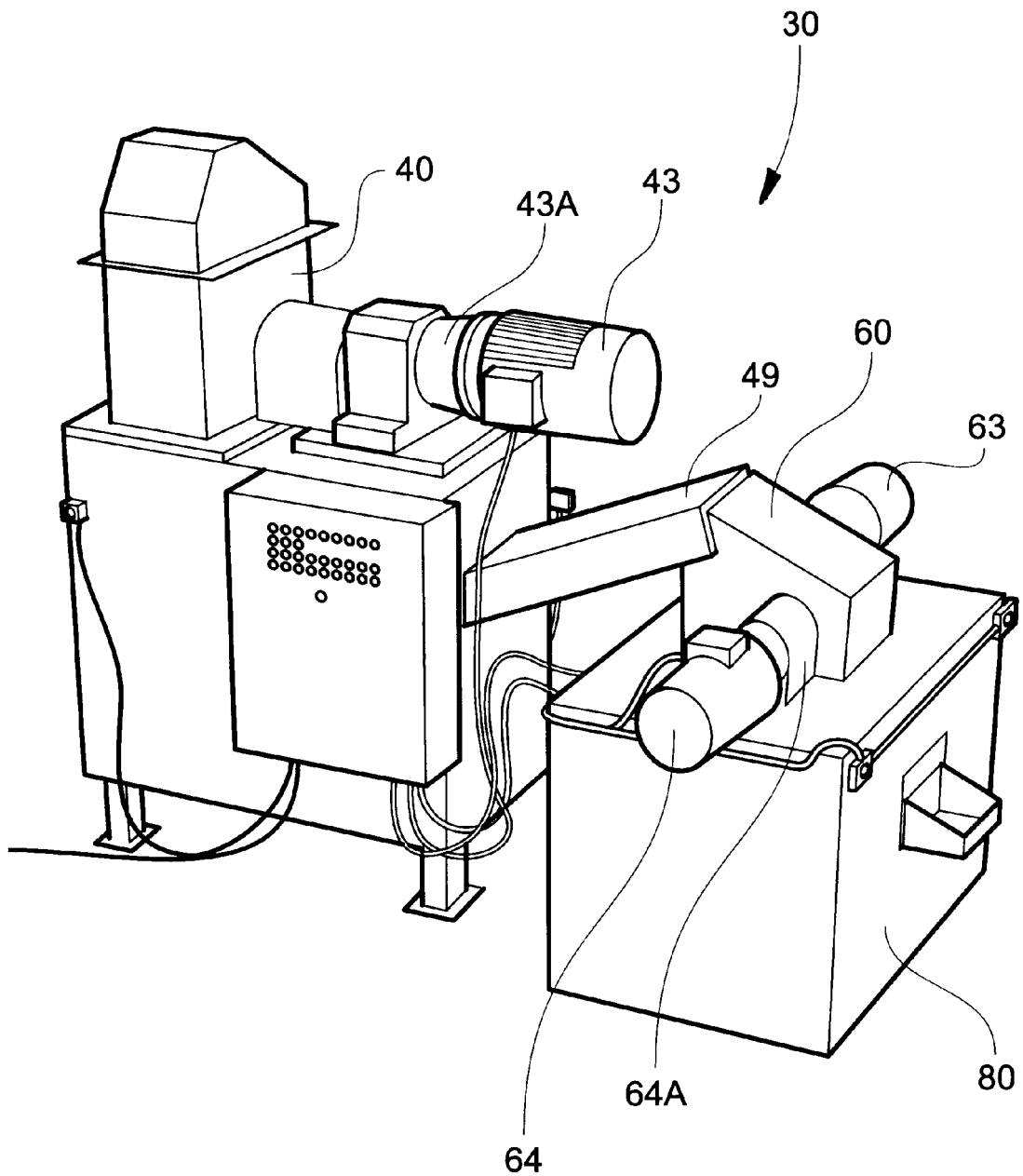
FIG. 4 is a perspective view of the granulator according to the preferred embodiment of the invention disclosed in this application.
Figure 5:
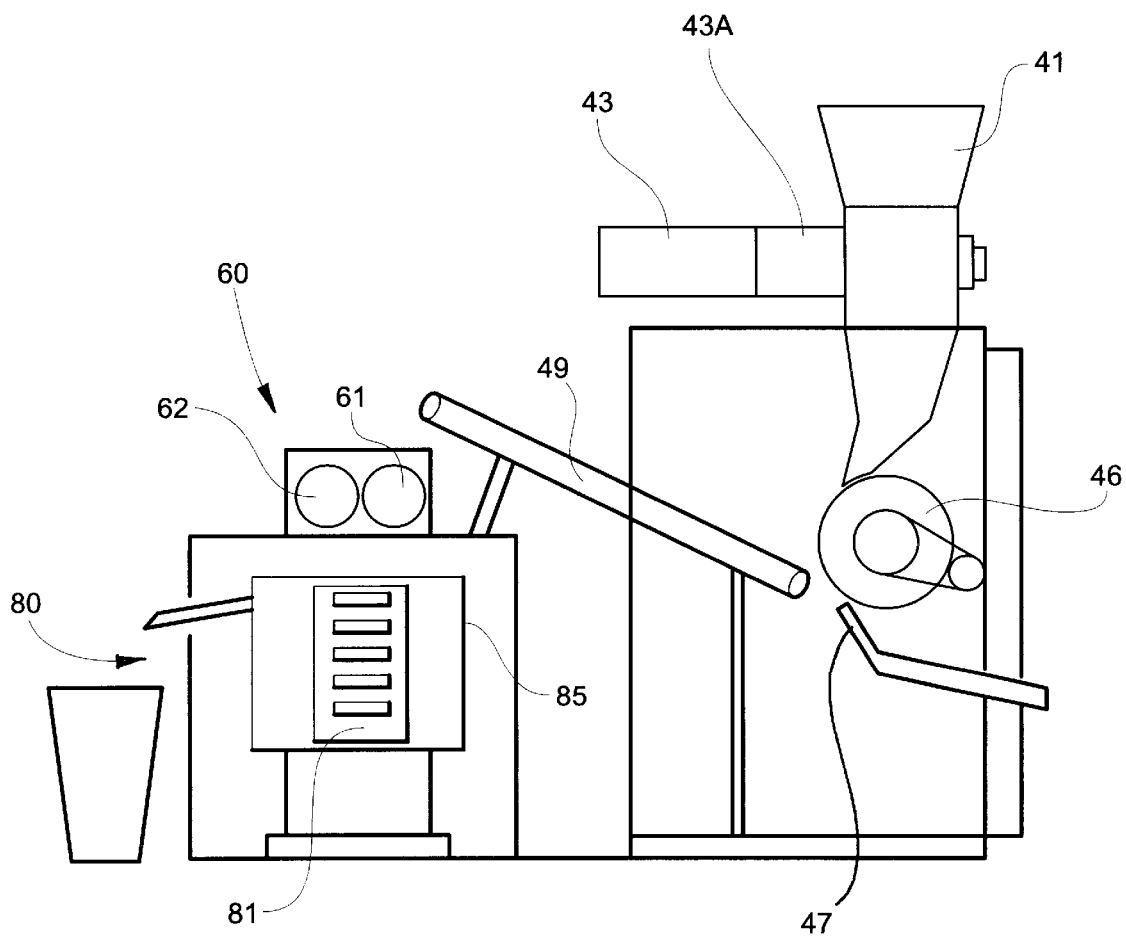
FIG. 5 is a side elevation of the granulator shown in FIG. 4.
Figure 6:
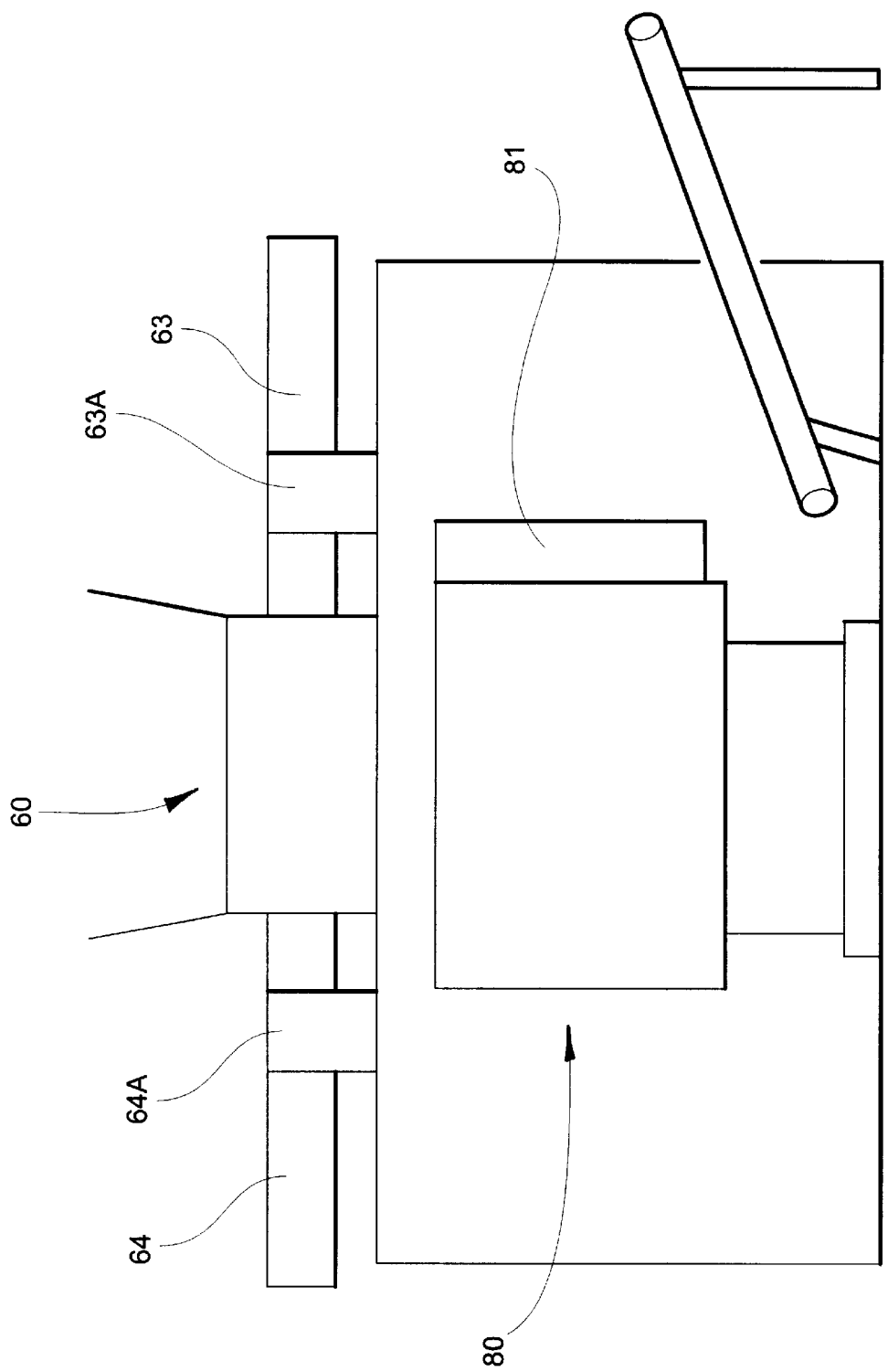
FIG. 6 is a end elevation of the granulator shown in FIG. 4.
Figure 7:
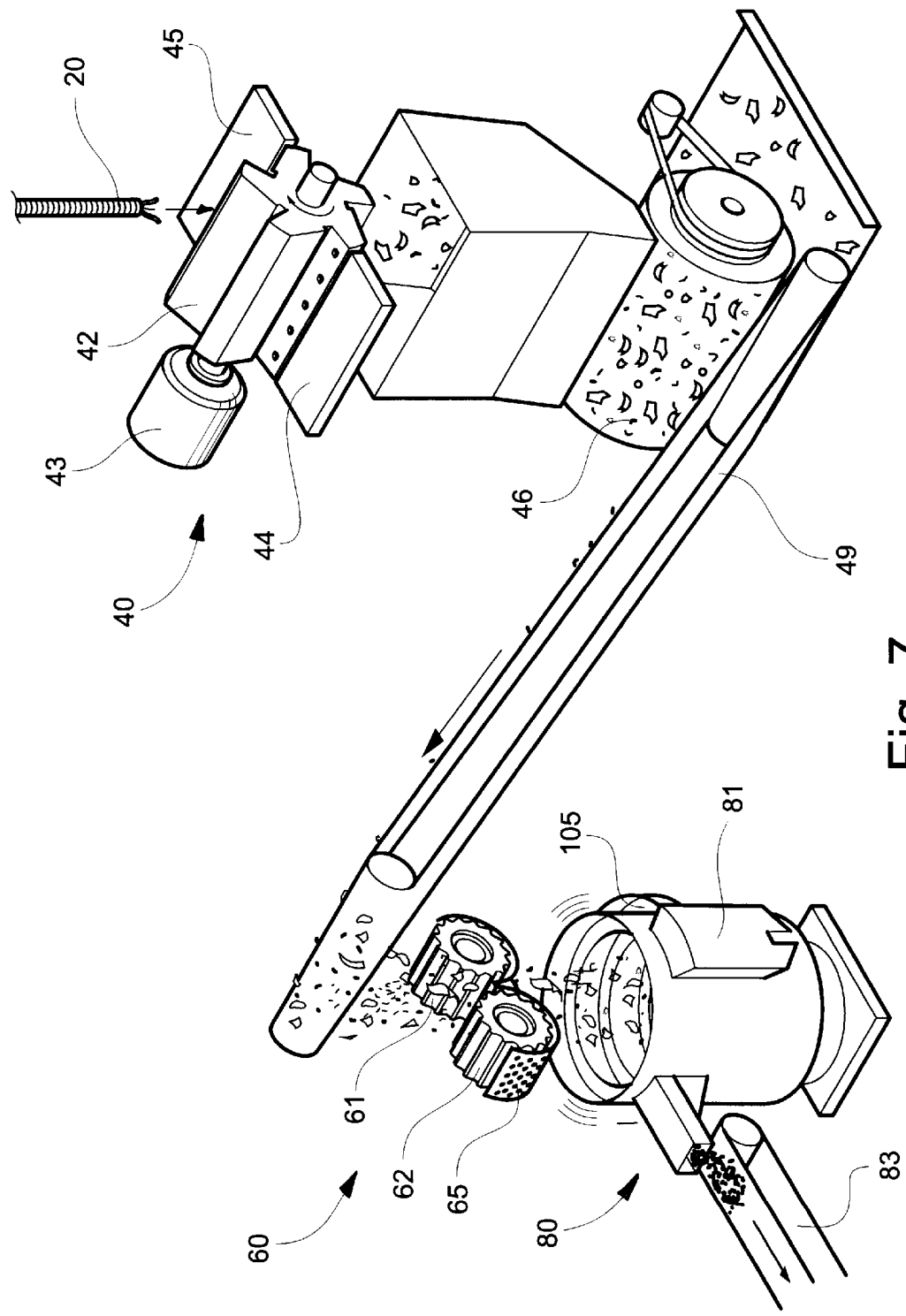
FIG. 7 is a simplified, schematic perspective view of the granulator shown in FIG. 4, with enclosures and other parts broken away to reveal the operating components of the granulator, and with some components not shown for clarity.

The granulator 30 as shown in FIGS. 4–17 accomplishes separation of the constituent parts of cable 20 quickly and efficiently. As is shown in FIGS. 4, 5 and 6, granulator 30 is formed of three basic components, a primary cable chopper 40, a secondary cable chopper assembly 60 and a vibratory bowl separator 80. Referring now to FIG. 6, cable 20 is pre-cut into relatively short lengths on the order of 20 cm to 60 cm and fed into a hopper 41 which feeds the cable 20 into contact with a rotating chopper 42 powered by a 20 horse-power electric motor 43 operating through a 14 to 1 gear reducer 43A. Chopper 42 cooperates with a pair of anvils 44 and 45 which cut the cable 20 into lengths of approximately 8 mm while stripping the rubber cover 21 from the steel wire 22. The heavy rubber cover 21 is cut into pieces which fall to the bottom of the granulator 30. The steel wire 22 is trapped on a magnetic drum 46 and scraped off by a blade 47, as shown in FIG. 5, while the non-magnetic pieces of copper wire 23 and plastic sheathing 24 material—now in 8 mm lengths—are carried onto conveyor belt 49 which elevates the material to a position over the secondary rotary chopper 60. The wire and plastic material is dropped between two counter-rotating choppers 61 and 62 which further comminutes the material into 3 mm pieces. This material is then deposited into the vibratory bowl separator 80, where it is sorted. The plastic sheathing 24 is discharged from a manifold 81 (See FIG. 6), while the copper 23 is discharged from a discharge slot into a container 82, as shown in FIG. 5, or onto a conveyor 83, as shown in FIG. 7. As described in further detail below, the vibratory bowl separator 80 uses a combination of vibratory motion and low pressure, high volume air blasts in the vibratory bowl separator 80 to separate the relatively low specific gravity plastic 24 from the relatively high specific gravity copper 23. Recirculation occurs automatically at several stages until virtually complete separation takes place.

Detailed Description of Operation of Granulator

Primary Cable Chopper

Figure 8:
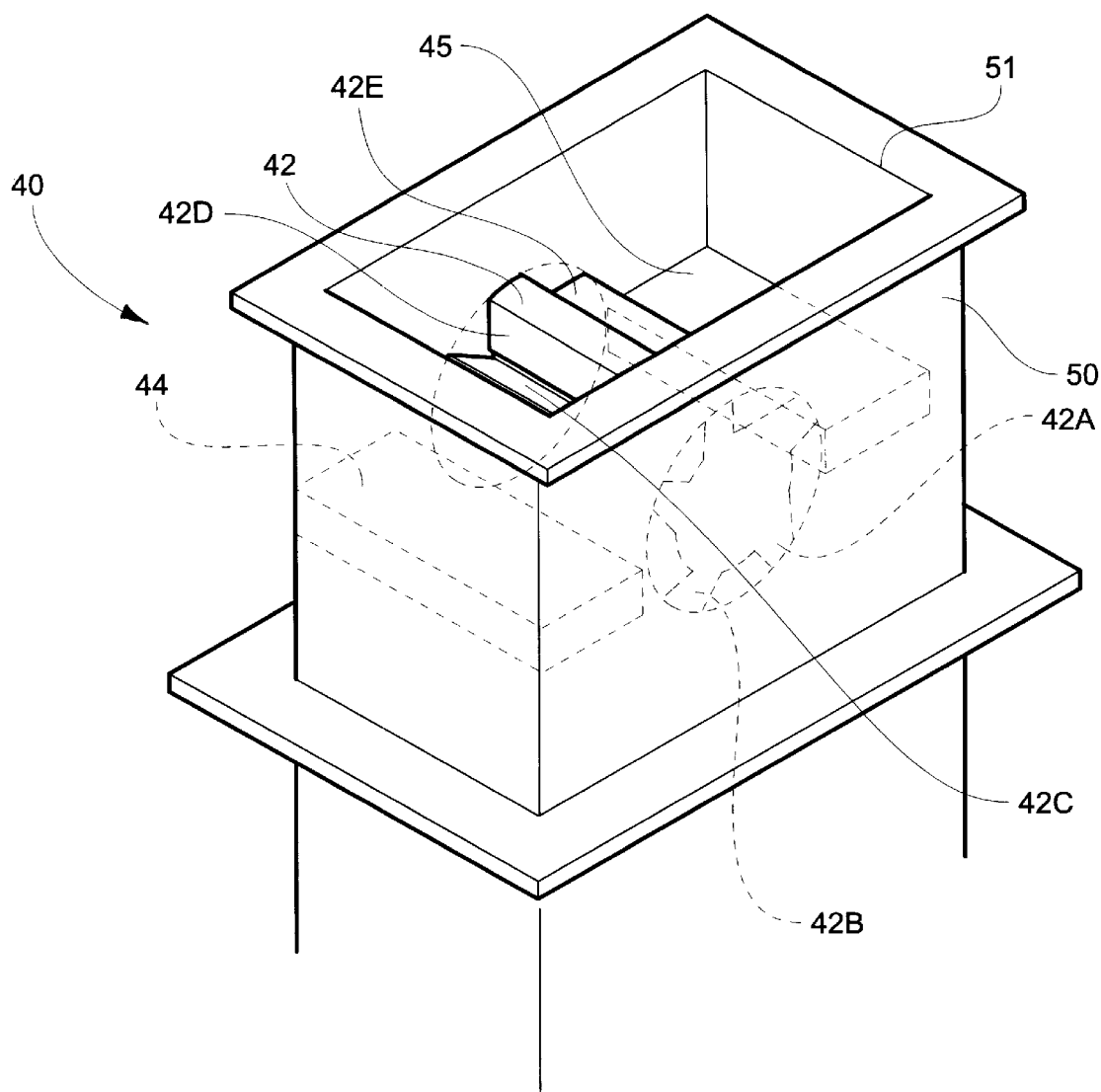
FIG. 8 is a fragmentary perspective view of the cutting rotor of the granulator.
Figure 9:
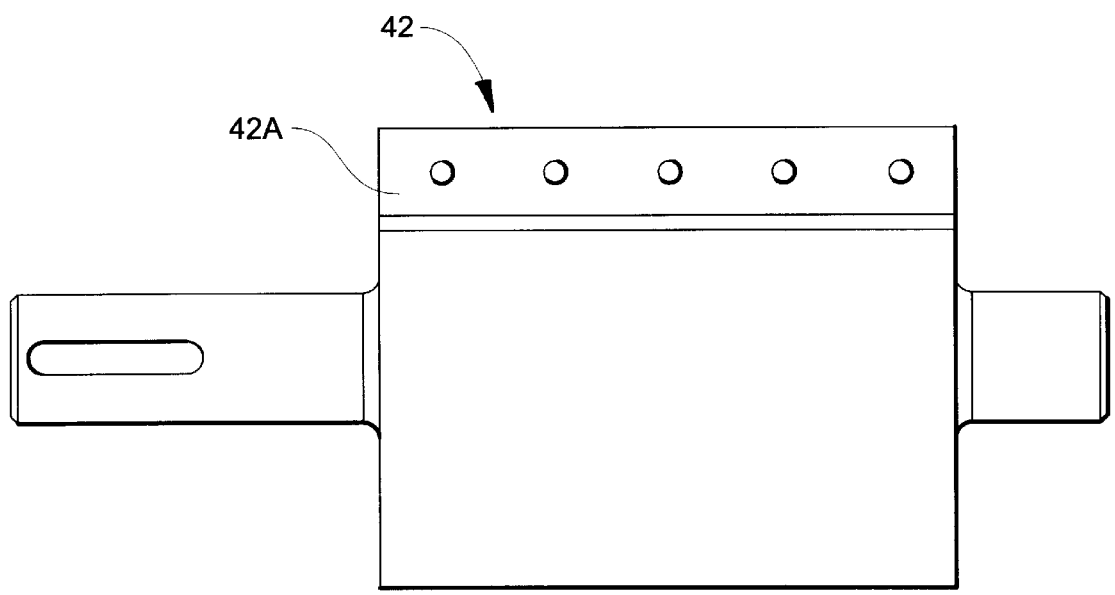
FIG. 9 is a longitudinal elevation of the cutting rotor of the granulator.
Figure 10:
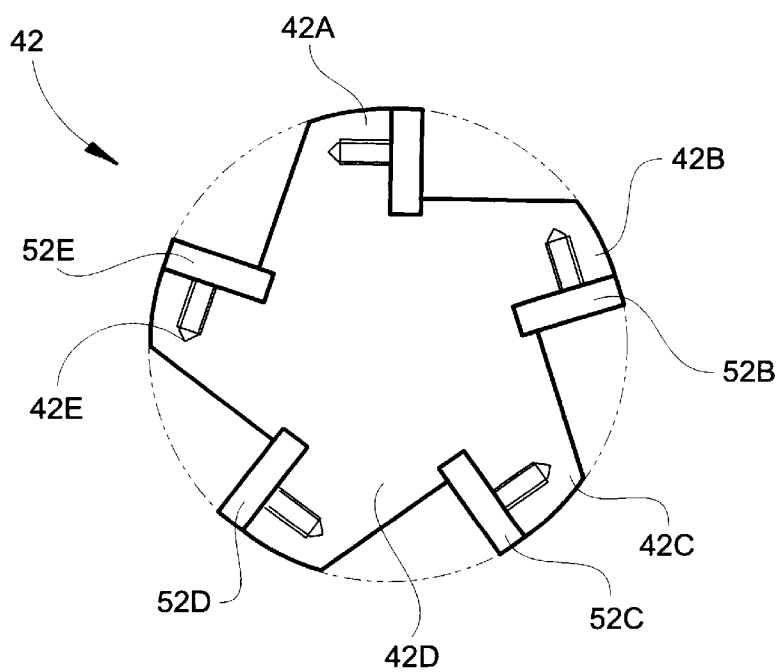
FIG. 10 is an end elevation of the cutting rotor of the granulator.
Figure 11:
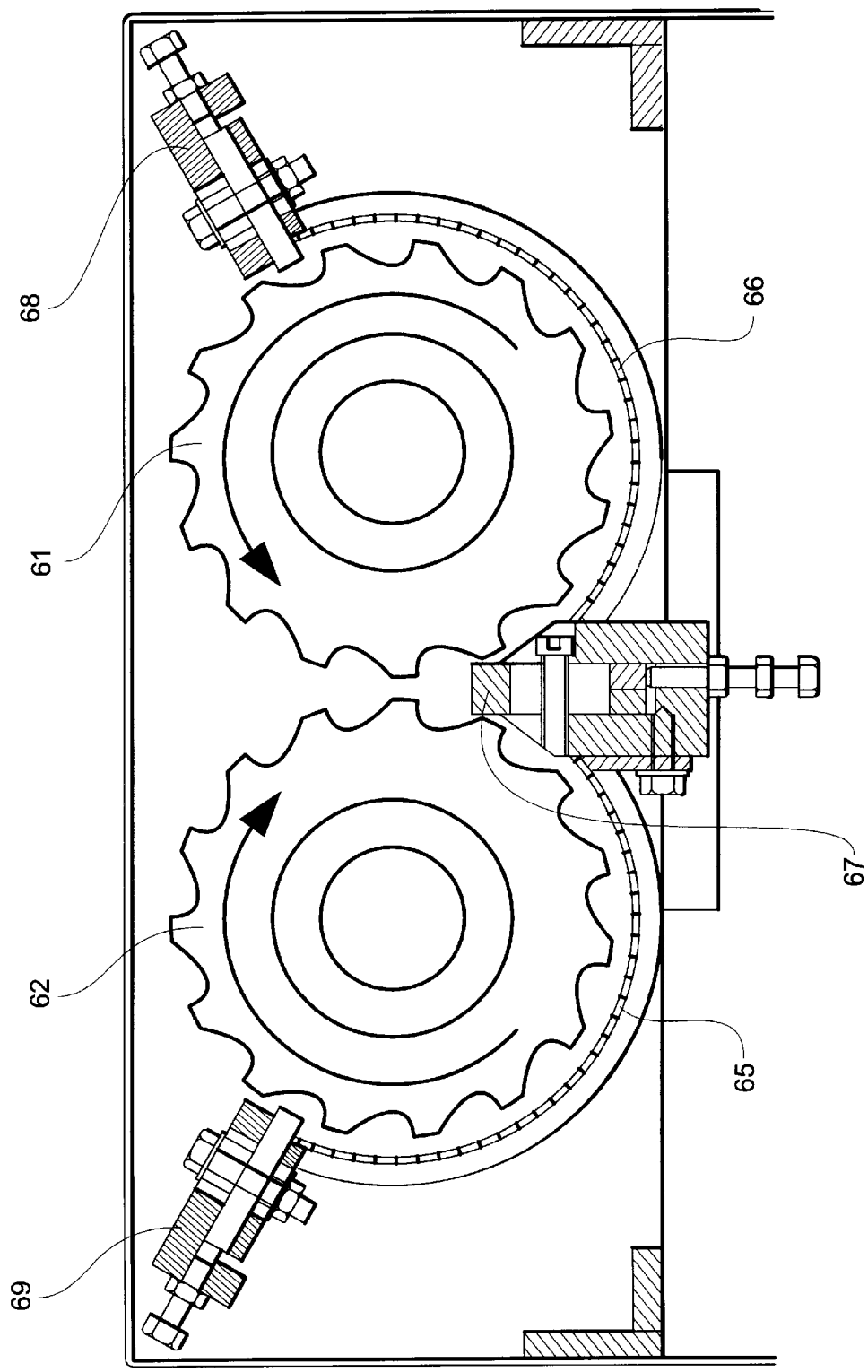
FIG. 11 is partial vertical cross-sectional view of the secondary rotary choppers of the granulator.

Referring now to FIGS. 8, 9 and 10, the primary cutting chopper 42 is shown in further detail. Chopper 42 is positioned within the hopper 41 with the sidewalls of the hopper 41 defining a top opening 51. The chopper 42 and the adjacent cutting anvils 44 and 45 form a barrier through which the pieces of cable 20 must pass into order to proceed downstream for further processing. It has been determined that for the type of armored cable 20 described above, a length of 8 mm is appropriate for separating the wire 22 from the copper 23 and the plastic 24. Thus, the chopper 42 has five equally spaced-apart cutting blades 42A–E which rotate at 100 rpm. Each blade 42A–E has a respective replaceable blade insert 52A-E of hardened D-2 tool steel.

A cutting gap of 0.13 mm between the blades 42A–E and the anvils 44 and 45 permits only pieces 8 mm or short from passing between the blades 42A–E and the anvils 44 and 45. A substantial percentage of the pieces of copper 23 are still sheathed in plastic 24. As shown in FIG. 7 and described above, short pieces of steel wire 22 are collected on the surface of a magnetic drum 46 and removed for separate processing.

Secondary Rotating Chopper

The 8 mm or shorter pieces of copper 23 and plastic 24 are fed on conveyor 49 to two counter-rotating choppers 61 and 62 of the secondary rotating chopper 60. As is shown in FIGS. 4 and 6, choppers 61 and 62 are powered by 10 horsepower motors 63 and 64 through 14 to 1 gear reducers 63A and 64A. The pieces are dropped into the top of the choppers 61 and 62. An adjustable anvil 67 is positioned below and between the choppers 61 and 62, and is adjusted relative to the blades of the choppers 61 and 62 so that the rotating blades chop into smaller pieces the copper 22 and plastic 23 which fall through the gap between choppers 61 and 62 onto the anvil 67. A pair of curved grills 65 and 66 are positioned under respective choppers 61 and 62 and are provided with openings which permit pieces 3 mm or smaller to pass through. Larger pieces are carried by the rotating choppers 61 and 62 back around where they fall back between the choppers 61 and 62 and are redeposited onto the anvil 67 where the pieces are cut again.

The distance between the rotating choppers 61 and 62 and the grills 65 and 66 is adjusted by adjustment mechanisms 68 and 69. This adjustment and the adjustment of the anvil 67 permits the size of the pieces leaving the secondary rotary chopper 60.

Vibratory Bowl Separator

Figure 12:
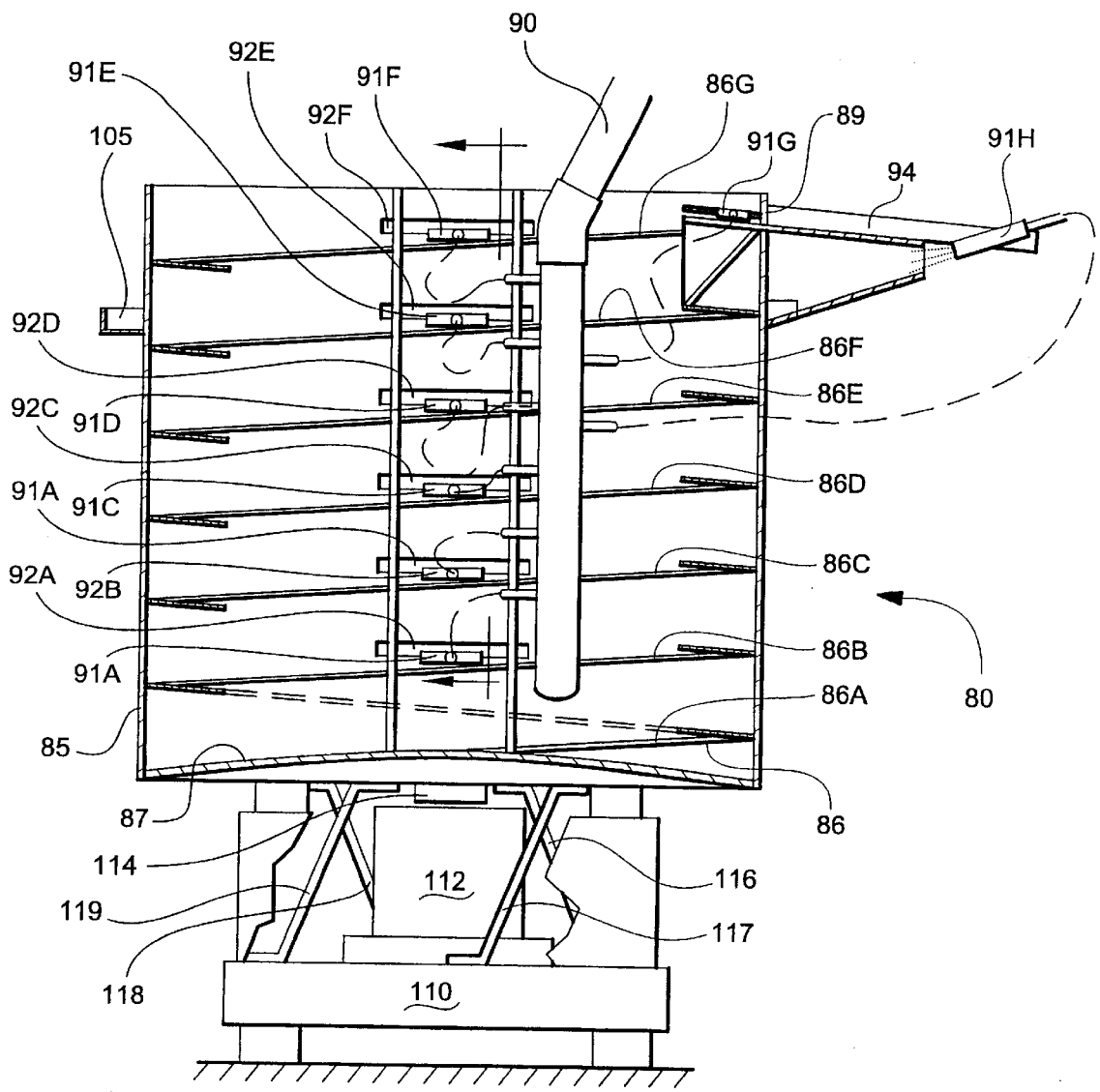
FIG. 12 is a vertical cross section of the vibratory bowl separator of the granulator.

Referring now to FIGS. 12–17, the vibratory bowl separator 80 according to the invention is shown in detail. As is shown in FIG. 12, vibratory bowl separator 80 comprises a cylindrical enclosure 85, the bottom wall 87 of which is convex. A spirally-extending, elongate track 86 is secured to the inner side walls of the enclosure 85 and extends between the convex bottom wall 87 and a copper discharge chute 89 adjacent the top of the enclosure 85. Track 86 extends around the enclosure at an angle of climb of 5 degrees, and in the embodiment shown in the drawings forms seven flights 86A–G. The innermost edge of track 86 has an upward tilt of 3 degrees, so that material on the track tends to move outwardly towards the inner wall of the enclosure 85. These features of the invention are variable depending on the type of material being processed and, for example, more or fewer flights may be desirable.

Pieces of copper 23 and plastic 24 3 mm or smaller falls from the secondary rotary chopper 60 into the enclosure 85 of the vibratory bowl separator 80 and onto the convex bottom wall 87.

An air supply manifold 90 supplies a high volume of air at low pressure to eight air jets 91A–H. Six air jets 91A–F are positioned adjacent respective elongate plastic discharge slots 92A–F formed into the side of enclosure 85. Only flight 86A has no plastic discharge slot. Air jet 91G is positioned adjacent copper discharge slot 89. Air jet 91H positioned adjacent a downwardly angled chute 94, as described in further detail below.

Figure 13:
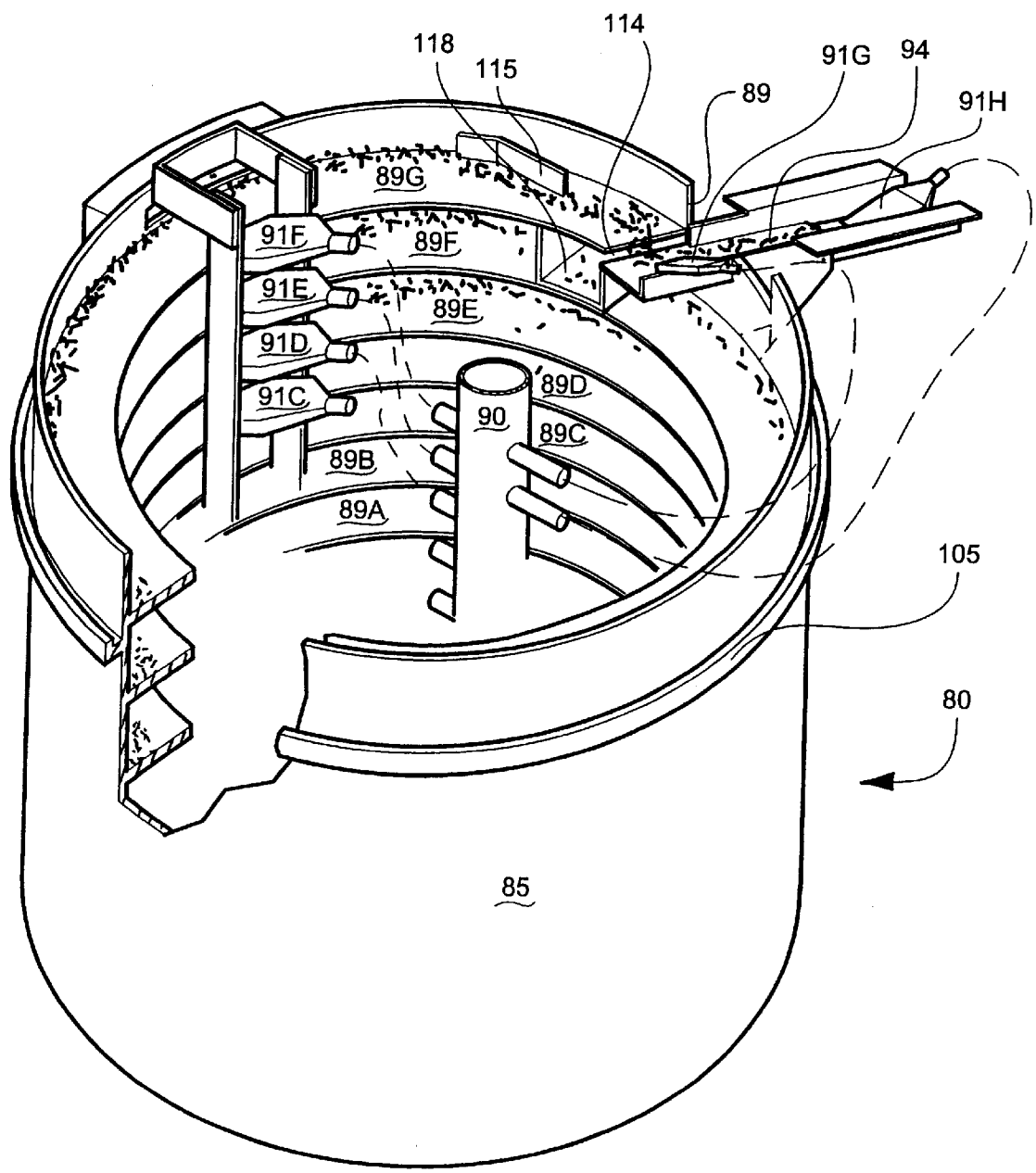
FIG. 13 is a perspective view with parts broken away of the vibratory bowl separator of the granulator.
Figure 17:
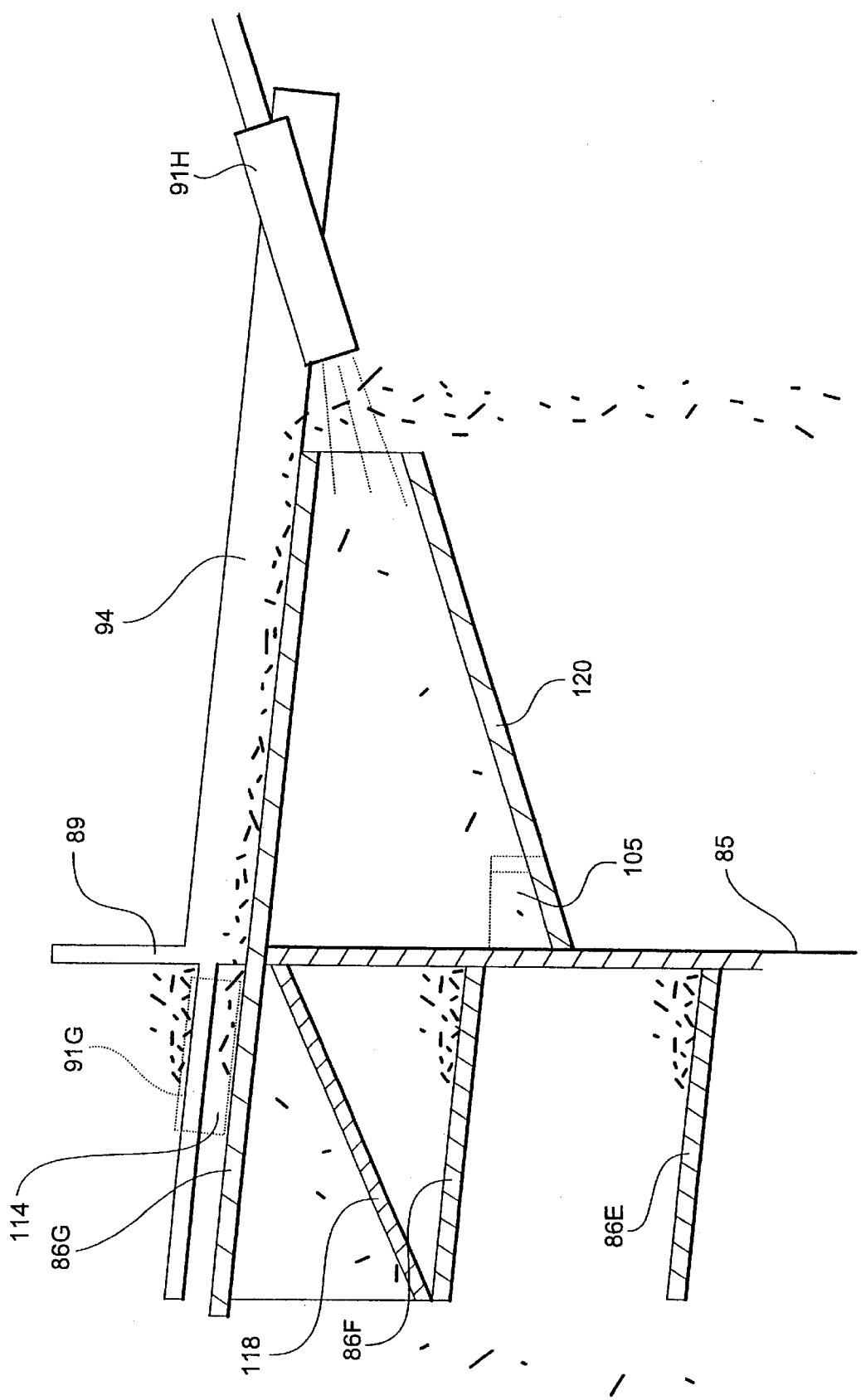
FIG. 17 is a fragmentary cross-sectional view of the discharge slot through which separated metal is discharged at the completion of the sorting process.

As is best shown in FIGS. 13 and 17, air jet 91G directs a jet of air onto flight 89G adjacent the copper discharge slot 89. Air jet 91H is positioned adjacent a downwardly angled chute 94 and directs a jet of air through a stream of copper pieces falling off of the end of the chute 94. These functions are described in further detail below.

Figure 15:
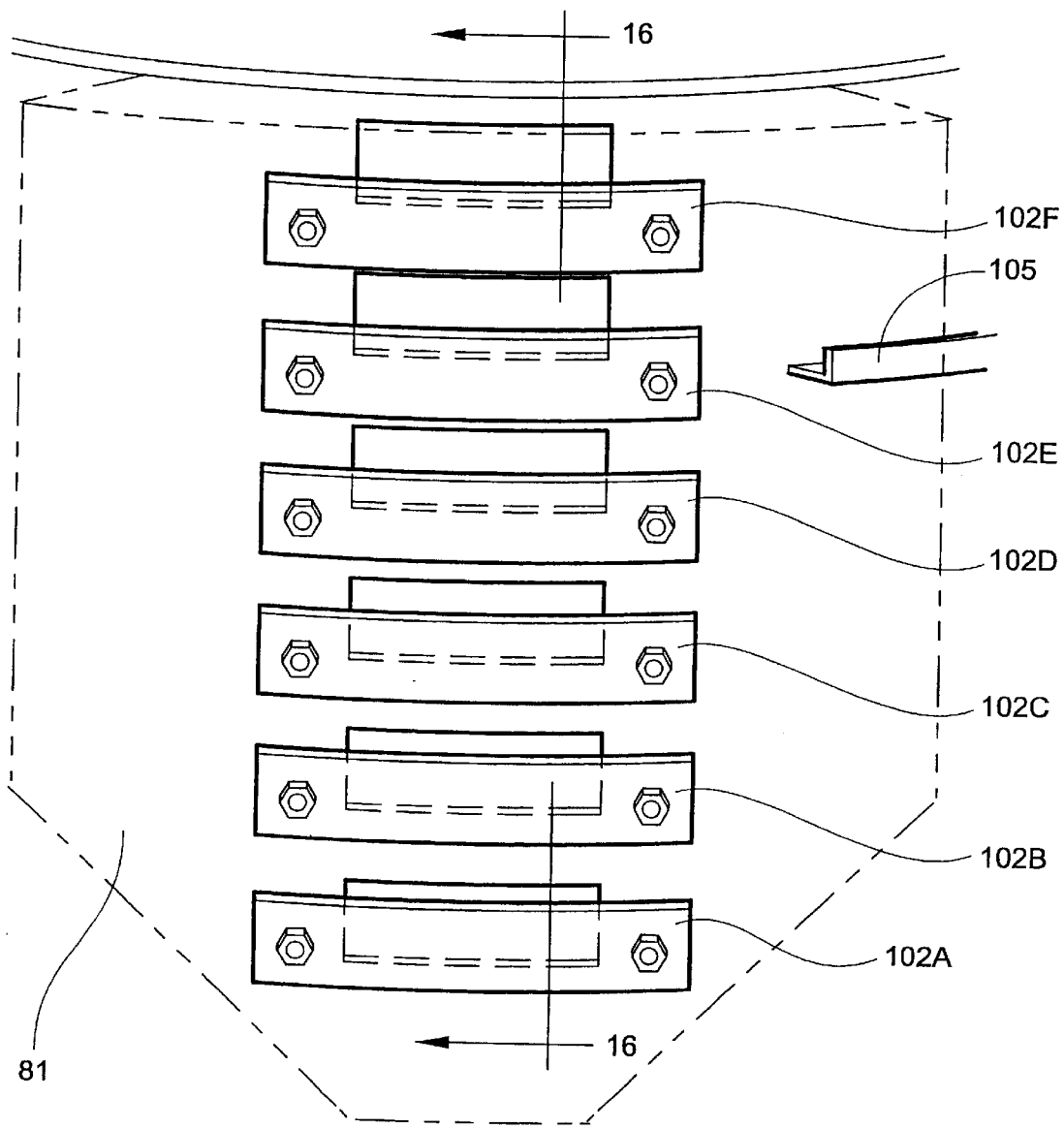
FIG. 15 is a fragmentary side elevation of the separating slots arrangement of the vibratory bowl feeder.
Figure 16:
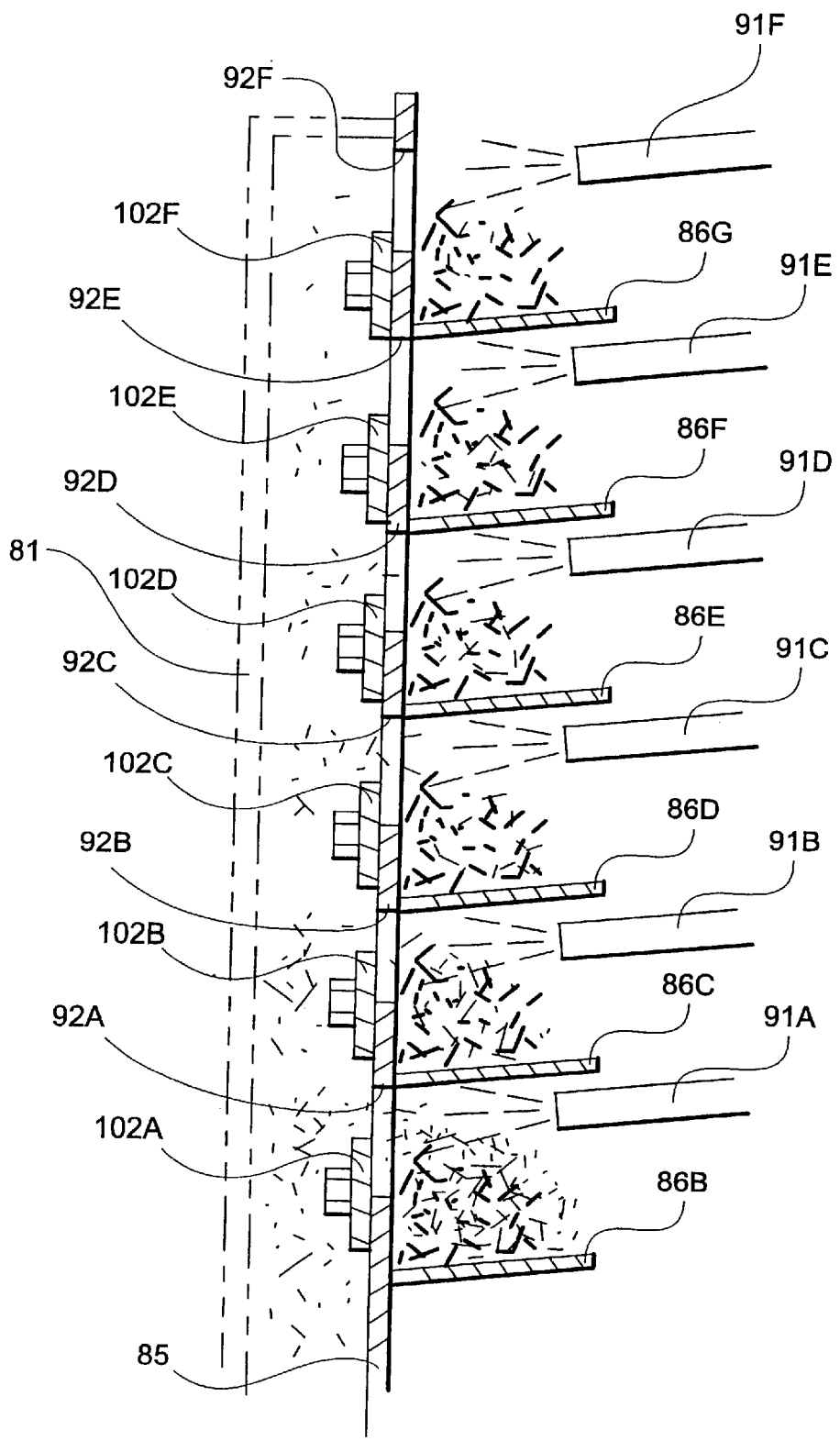
FIG. 16 is a fragmentary cross-section of the separating slots arrangement of the vibratory bowl feeder, taken along a line perpendicular to the view shown in FIG. 15.

Referring now to FIGS. 15 and 16, the plastic discharge slots 92A–F are vertically arrayed relative to each other and partially covered by respective adjustable weirs 102A–F. Weirs 102A–F are adjusted to cover a predetermined percentage of the height of each of the slots 92A–F. These weirs 102A–F effectuate separation of the plastic pieces 24 from the copper pieces 23. The entire assembly is covered by manifold 81 which directs the air-entrained plastic downwardly.

A single exterior recirculation channel 105 is formed on the outer wall of enclosure 85 and discharges plastic pieces 23 which were not ejected from the vibratory bowl separator 80 through the discharge slots 92A–F into the manifold 81.

Figure 14:
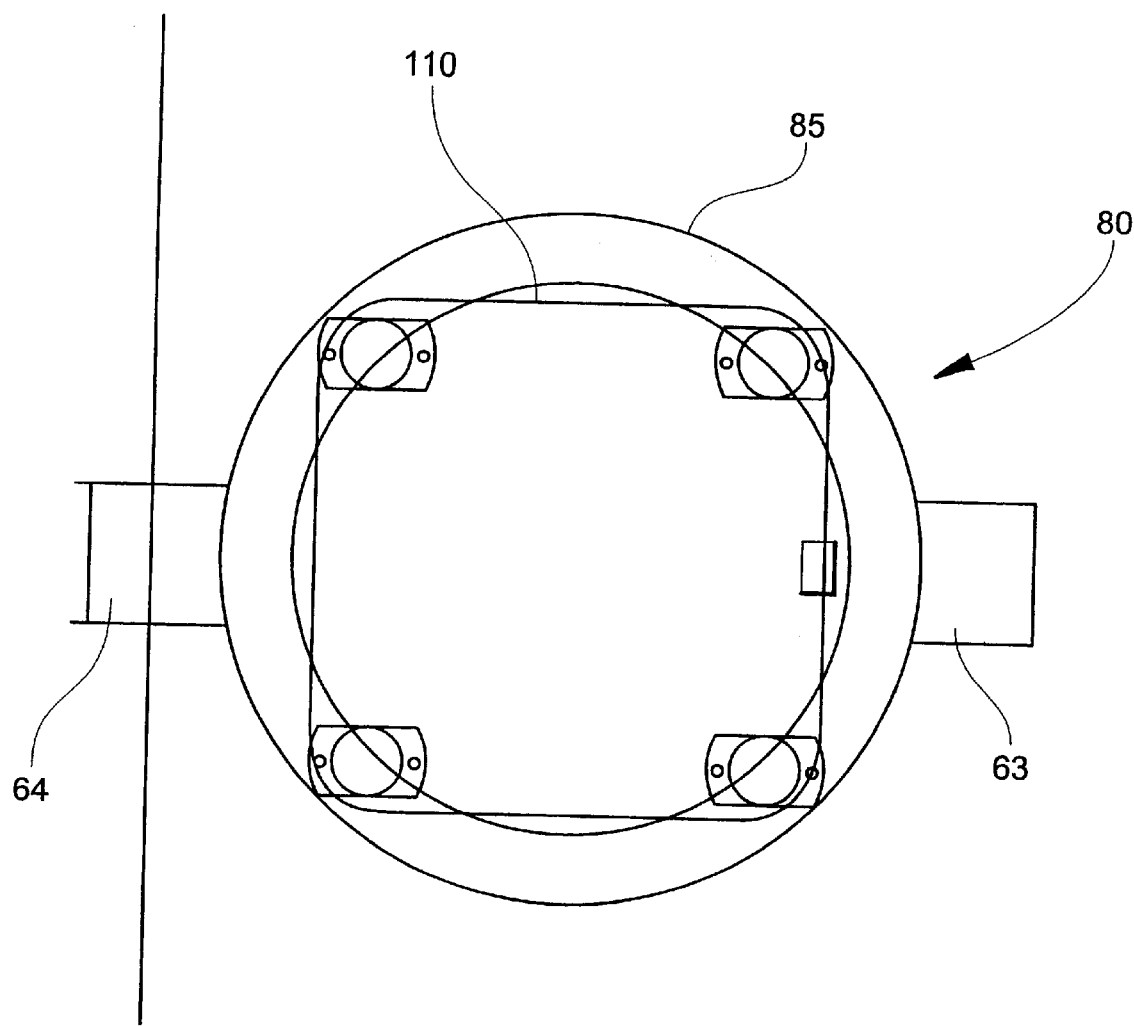
FIG. 14 is a bottom plan view of the base of the vibratory bowl separator showing the positioning of the bowl mounts.

The entire enclosure 85 and all of the elements of the vibratory bowl separator 80 described above are mounted for vibration on a base 110. Base 110 is securely mounted onto a flooring surface, for example by bolts to a concrete floor, and supports an electromagnet 112. Electromagnet 112 alternately engages and disengages a magnetically-attractable plate 114 secured to the bottom of enclosure 85 with an amplitude oscillation of 1.5 mm. The maximum distance between the upper surface of the electromagnet 112 and the plate 114 is between 1 mm and 1.2 mm. Base 110 is attached to the enclosure 85 by four elongate legs 116–119. The angle between the legs 116–119 and the base is between 59 and 64 degrees. This structure causes the enclosure to move at a predetermined amplitude and frequency in two directions simultaneously-vertically and rotationally. The position of the legs in relation to the base is shown in FIG. 14. These conditions are variable, and the air gap, amplitude oscillation and other operating parameters may be altered to take into account the material being processed, the size and shape of the copper desired at the output end, the type and condition of the plastic covering the wire and similar factors.

Description of Separation Process in Vibratory Bowl Separator

As noted above, a mixture of copper 23 and plastic 24 falls into the enclosure 85 and onto the convex bottom wall 87. The vibration causes the mixture to move outwardly onto the bottom most flight 86A of the track 86. The mixture is carried up the track 86 progressively from flight 86A to 86G. This occurs by the effect of the angle of the legs 116–119 on the movement of the enclosure 85. Each activation of the electromagnet moves the enclosure 85 and the mixture on the track 86 a few millimeters clockwise. When the electromagnet 112 deactivates, the enclosure 85 returns to its original position, leaving the mixture a few millimeters further up the track 86. At the same time, the vibration keeps the copper 23 and plastic 24 in motion relative to each other. This relative motion causes the much denser copper 23 to settle to the bottom of the mixture, displacing the plastic 24 onto the top of the mixture. After a short period of operation, there exists on the track 86 a spirally-extending mixture of copper 23 and plastic 24 from the bottom flight 86A to the top flight 86G.

The percentage volume of copper 23 to plastic 24 varies with the type of cable, but cable 20 generally comprises about 75 percent by volume plastic 24 and 25 percent by volume copper 23. As this mixture of copper and plastic progresses upwardly from flight-to-flight, it passes successive plastic discharge slots 92A–9F. The partially separated mixture of the copper and plastic mixture on flight 86B first passes plastic discharge slot 92A. Air jet 91A projects an outwardly, radially-extending jet of low pressure, high volume air across the track 86. As is best shown in FIG. 16, the uppermost layer of plastic 24 is blown off of the top of the mixture of copper 23 and plastic 24 through the discharge slot 92A. As the mixture continues to move upwardly the separation of the plastic 24 and copper becomes progressively more distinct.

At each successive flight 86C–86G the respective air jet 91B–91F projects a radially outwardly-extending jet of air across the mixture, blowing the plastic 24 laterally off of the underlying copper 23 and out through the plastic discharge slots 92B–F. The mixture at the uppermost flight 86G is approximately 95 percent by volume copper 23 and 5 percent by volume plastic, and between 80 and 90 percent of this 5 percent is removed by the air jet 91F.

Referring now to FIGS. 13 and 17, the copper 23 and a very slight amount of remaining plastic 24 continues clockwise past a diverter plate 115 which moves the mixture away from the side wall of the enclosure 85. The mixture falls off of the end of the track 86 past a narrow slot 117 and onto the chute 94. The relatively dense copper 23 vibrates radially-outwardly along the chute 94 towards the air jet 91H, which any remaining particles of the much less dense plastic 24 is blown by the air jet 91G through the slot 114 and onto a downwardly-extending wall 118 which reintroduces the material back into the enclosure 85, where it falls back to the bottom onto the convex bottom wall 87.

A final cleaning of the now nearly 100 percent stream of copper 23 occurs as the air jet 91H projects a stream of air through the copper 23 as it falls off of the outer end of the chute 94. Any remaining dust, plastic 24 or other lightweight material is blown from the falling stream of copper 23 and into a chamber 120 which deposits the dust, plastic 24 and other lightweight material onto the exterior recirculation channel 105. This material is vibrated around the outer periphery of the enclosure 85 and into the manifold 81 with the other plastic 24 as it is being ejected through the slots 92A–91F.

The result is a pure separation of plastic 24 from copper 23, leaving a dense, low volume mass of 3 mm copper particles ideal for efficient transport and recycling. The plastic, while less valuable, is also virtually pure plastic and therefore suitable for recycling, as well.

The granulator 30 has been demonstrated that it is capable of processing one metric ton of copper per day.

A granulator is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A granulator for separating the constituent parts of electrical cable containing relatively light-weight plastic covering relatively heavy electrically-conductive material, comprising:

(a) a first cutter for cutting the cable into short pieces;

(b) a second cutter for cutting the short pieces of cable to a still shorter length sufficient to detach the plastic from the electrically-conductive material to form a mixture of small pieces of plastic and electrically-conductive material;

(c) a vibratory sorter for separating the mixture of plastic and electrically-conductive material, and comprising:

(1) an elongate, circular and spirally-extending track having a material inlet adjacent a bottom end thereof for receiving the mixture of plastic and electrically-conductive material for separation and a electrically-conductive material discharge slot adjacent a top end thereof for discharging electrically-conductive material;

(2) vibration means for imparting vibratory motion to the mixture of plastic and electrically-conductive material sufficient to cause the mixture to move upwardly along the track and to vertically separate into a relatively heavy bottom layer of electrically conductive material and a top layer of relatively light-weight plastic pieces riding on top of the layer of electrically-conductive material;

(3) a plurality of vertically spaced-apart air jets applying respective radially-extending air blasts to the top layer of plastic pieces as the plastic pieces vibrate progressively up the track on top of the electrically-conductive material, said air blasts having sufficient energy to blow the plastic pieces off of the track but insufficient energy to blow the electrically-conductive material off of the track; and (4) a plurality of vertically spaced-apart discharge slots aligned with the track for permitting passage from the track of the plastic pieces blown radially-outwardly by the air jets whereby only electrically-conductive material is ejected from the vibratory sorter through the electrically-conductive material discharge slot.

2. A granulator according to claim 1, wherein said electrical cable includes magnetically-attractable armor which is cut into short pieces by the first cutter, and wherein said granulator includes magnet means for extracting the short pieces of magnetically-attractable armor from the plastic pieces and the electrically-conductive material.

3. A granulator according to claim 1, wherein said spirally-extending track is contained within a bowl-shaped housing.

4. A granulator according to claim 1, wherein the air blasts from the air jets are at a relatively high volume and low pressure.

5. A method of separating the constituent parts of electrical cable containing relatively light-weight plastic covering relatively heavy electrically-conductive material, comprising the steps of:

(a) cutting the cable into short pieces in a first cutting step;

(b) cutting the short pieces of cable to a still shorter length in a second cutting step sufficient to detach the plastic from the electrically-conductive material to form a mixture of small pieces of plastic and electrically-conductive material;

(c) separating the mixture of plastic and electrically-conductive material, said separating step comprising the steps of:

(1) introducing the mixture into an elongate, circular and spirally-extending track through a material inlet adjacent a bottom end thereof;

(2) imparting vibratory motion to the mixture of plastic and electrically-conductive material on the track sufficient to cause the mixture to move upwardly along the track and to vertically separate into a relatively heavy bottom layer of electrically conductive material and a top layer of relatively light-weight plastic pieces riding on top of the layer of electrically-conductive material;

(3) applying a series of vertically spaced-apart, radially-extending air blasts to the top layer of plastic pieces as the plastic pieces vibrate progressively up the track on top of the electrically-conductive material, said air blasts having sufficient energy to blow the plastic pieces off of the track but insufficient energy to blow the electrically-conductive material off of the track;

(4) discharging the radially-blown plastic pieces from the track; and (5) ejecting the electrically-conductive material from the track through an electrically-conductive material discharge slot.

6. A method according to claim 5 and including the step of extracting any magnetically-attractable material in the electrical cable by means of magnet.

7. A method according to claim 5 and including the step of passing the cut pieces of plastic and electrically-conductive material through a grill having openings of a predetermined small size for insuring uniformity of the size of the plastic pieces and electrically-conductive material.

8. A vibratory sorter for separating a mixture of at least first and second materials having respective relatively high and low specific gravities, and comprising:

(a) an elongate, circular and spirally-extending track having a material inlet adjacent a bottom end thereof for receiving the mixture for separation and first and second discharge openings for discharge of the respective first and second materials;

(2) vibration means for imparting vibratory motion to the mixture having sufficient amplitude and direction to cause the mixture to move upwardly along the track and to vertically separate into a relatively heavy bottom layer of high specific gravity material and a top layer of relatively low specific gravity pieces riding on top of the bottom layer of high specific gravity material;

(3) a plurality of vertically spaced-apart air jets applying respective radially-extending air blasts to the top layer of material as the material vibrates progressively up the track on top of the bottom layer of material, said air blasts having sufficient energy to blow the top layer of material off of the track and through the first discharge opening, but insufficient energy to blow the bottom layer of material off of the track; and (4) a plurality of vertically spaced-apart discharge slots aligned with the track for permitting passage from the track of the pieces of material on the top layer which were blown radially-outwardly by the air jets whereby only pieces of material from the bottom layer are ejected from the vibratory sorter through the second discharge opening.

\* \* \* \* \*